United States Patent [19]

Heine et al.

[11] 4,167,586
[45] Sep. 11, 1979

[54] PROCESS FOR PREPARING BLOOD ALBUMIN PRODUCT AND THE RESULTING PRODUCT

[76] Inventors: Juan Heine; Rudolfo Trama; Eduardo Penedo, all of Espara 146 0, Adrogué, Argentina

[21] Appl. No.: 845,939

[22] Filed: Oct. 27, 1977

Related U.S. Application Data

[63] Continuation-in-part of Ser. No. 737,336, Nov. 1, 1976, abandoned.

[30] Foreign Application Priority Data

Nov. 28, 1975 [AR] Argentina .............................. 261412

[51] Int. Cl.² ................................................ A23J 3/00
[52] U.S. Cl. .................................... 426/250; 426/614; 426/647; 426/657
[58] Field of Search .................. 426/92, 98, 302, 647, 426/657, 471, 614, 250

[56] References Cited

U.S. PATENT DOCUMENTS

| | | | |
|---|---|---|---|
| 653,956 | 7/1900 | Hamilton | 426/647 X |
| 684,978 | 10/1901 | Dietrich | 426/647 |
| 786,111 | 3/1905 | Gollwitzer | 426/647 |
| 1,277,336 | 8/1918 | Moskovits et al. | 426/647 X |
| 2,155,417 | 4/1939 | Griffith | 426/657 X |
| 2,171,428 | 8/1939 | Griffith et al. | 426/657 X |
| 2,241,868 | 5/1941 | Reimann | 426/647 X |

*Primary Examiner*—Robert A. Yoncoskie
*Attorney, Agent, or Firm*—McGlew and Tuttle

[57] ABSTRACT

A high proteinic composition, useful for preparing human foods, is made with a lipophilic phase composed of microparticles of fatty material, a continuous hydrophilic phase surrounding said lipophilic phase and composed of animal blood albumin having a solids content of at least three weight percent. Both said phases are associated with one or more emulsifying agents in an aqueous medium, and the fatty material is present in the range of from about 4.0 to about 17 weight percent of the composition. In a preferred embodiment, blood albumin is added to said high proteinic composition in a phosphated and liquid state in a proportion not less than about 50 weight percent of the composition.

9 Claims, No Drawings

PROCESS FOR PREPARING BLOOD ALBUMIN PRODUCT AND THE RESULTING PRODUCT

CROSS-REFERENCE TO RELATED APPLICATION

This application is a continuation-in-part of our co-pending application Ser. No. 737,336, filed Nov. 1, 1976 now abandoned, for "An Additive For Human Food, With A High Proteinic Value, Dehydratable, Serving For The Preparation Of Food Products, And Manufacturing Process Of The Same".

BACKGROUND AND SUMMARY OF THE INVENTION

1. Field of the Invention

This invention relates to a new and useful composition with a high proteinic value, capable of dehydration, and useful for the preparation of human food products and a method of preparing the same.

The term phosphated or citrated blood means briefly to treat the blood with, or to add to it sodium citrate or phosphates, as anticoagulant agents, in order to centrifuge and to separate the sanguineous or blood corpuscles, the hemoglobin and the plasma. This process is ordinary in that connection. (See, for example, pages 4 to 107 in the book "Blood Derivatives and Substitutes" of Whit Ch. S. and Weinstein J. J., The Williams and Wilkin Co., 1947). As referred to the human blood, the method can be found in "Tratado de Farmacognosia" by Heber U. Younghen, translated from the sixth English edition, by Francisco Giral, Editorial Atlante, S.A., Mexico D.F., 1951, page 1211.

As regards the terms "emulsifiers", "surfactants", we quote, for a better understanding, the title and the first paragraphs of the "Boletin Tecnico L.G.-19-11 M-2-66" of Atlas Chemical Industries, Inc. of the United States:

"Emulsifier? . . . Surfactant? Which is the proper term to describe chemical compounds that promote the mixing of oil and water, provide "dryness" in ice cream and retard stalling of yeast-raised baked foods?. "Surfactant" is the more generally used term of the two and is preferred. That is, surfactants reduce surface tension between fat and water . . . promote the rehydration of "instant" foods . . . as well as insure emulsification of vitamins and flavoring oils. Emulsifier is more correctly used when the surfactant's chief purpose is to stabilize a mixture of two immiscible liquids such as oil and water".

Referring to the term "lactylate", as can be seen in "Food and Processing", May 1976, page 65, it is described in this way:

"Lactylated" fatty acids or esters represent a highly functional group of food emulsifiers used primarily in applications where aeration is required such as in toppings, cakes and icings. They are made by use of dehydrated lactic acid and acyl chloride. The products have more surface activity and are slightly more hydrophilic than the mono- and diglycerides.

Regarding the meaning of the term "dehydratable" it is observed that not all products can pass from the liquid state to the powdered one, without losing their basic properties. In the present application, the product is termed dehydratable because it can pass from the liquid state to the powdered one as a whole, keeping all the properties of the composition of the product. Therefore, this term is limitative of the products because of this essential condition of keeping these properties, and when hydrated again, it returns to the state of the former steady emulsion, as in the beginning and with the same properties. Furthermore, it is significant, precisely because it is pointed out that it can be converted from liquid to powder and then be rehydrated or hydrated once again.

2. Prior Art

U.S. Pat. No. 2,171,428 discloses some similar components to those of the present invention (blood and stabilizer, gum for example) but does not necessarily suggest the formula of this invention, using mainly and occasionally, unpredictable ingredients. As for the rest, the destiny of the product of this patent is by no means different from the present application. On the other hand, the U.S. Pat. No. 2,171,428 aims at a greater exploitation and stabilization of the basic matters in sausage, meanwhile the composition of the presently claimed invention substitutes as a replacement for the whole egg. The product of the present application has always at least one or two emulsifiers and the stabilizers are used only when necessary.

In the U.S. Pat. No. 2,171,428 the patentees could have used gum and milk only and get almost the same result. In addition to the lack of identity with the main and accessory components of the present invention, it is well known that, in the physio-chemical processes, some products or raw materials of common use, when used in some different processes, yield final products with their own identity, i.e. with different properties. Clearly summing up, the final result is different.

U.S. Pat. No. 1,277,336, although it may use similar components does not suggest the present invention, since the properties are different. The sought result is important. This patent sought and obtained the substitution of the egg's yolk; in the present application, the substitution of the whole egg (clearer yolk) is sought.

The use of sugar in the present invention, also referred to in U.S. Pat. No. 653,956, is accessory and not fundamental. If the whole egg contains sugars, when it is desired to reproduce it, necessarily sugar must be used. This accessory additive does not belong to the essence of the invention.

When one wishes to reproduce a product similar to another existing in nature, its constitutive elements should be combined so that the product could be obtained effectively. In that lies the invention and not in catching scattered known elements and by an adequate unforseeable process, combining them to get the object. In the present application, it is shown how this process should be developed in the examples which follow.

Supporting the above remarks, it should be observed that in the U.S. Pat. No. 1,277,336 the concentrated plasma is used, as well as in U.S. Pat. No. 2,171,428, as an emulsifying agent for fatty materials, so that in the former the plasma is carried out to the "syrup" point, a term that surely is rather undefined; and in the latter, in greater accuracy, to "several solid contents", but generally, high. But in the present invention, a precisely inverted process is developed, since a first or second emulsifying agent is used to obtain fatty materials emulsified with the water which is there added.

The aforesaid patient, as above noted, uses the plasma as an emulsifying agent, and the present inventors do not use it in this way. They use the plasma as a protein carrying element; meanwhile they use as emulsifying agents glyceryl monoesterate and lecithin, as in the basic formula given for example; or another series of emulsifying agents, according to the fatty materials to be emulsified. It should be noted that the process in the present application starts adding fat to one or to several of the above said agents; then adding whole water (observing the temperature of the process while adding these elements).

We point out that, from the phase "water in fat" through stirring and through the added emulsifiers, the present inventors go on to the phase "fat in water", having already obtained an emulsion, without using yet the albumin or the plasma. We reiterate that the plasma is used as a protein agent. They do not deny its emulsifying action; but they add it when they have already the emulsion with the fat, the water and said emulsifying agents. Moreover, they point out that the plasma in this invention could be used even in powdered form, without impairing the process at all, nor impeding the product's obtention.

We outline the latter because in the aforesaid patents they could not use powdered plasma, since they use it as an emulsifying agent and the said powdered plasma could not fulfill these functions because they do not use water in its composition.

We are sure that in the aforesaid patents, the emulsion could not be obtained through powdered plasma; in the present invention, it can be so obtained, because when the plasma is added in its original state (or powdered) the emulsion with the fats, with the emulsifying agents and with the water, is already made.

Returning to the above, the invention's essential element is not the use of known ingredients, but the unexpected way they are used to get the aimed final and surprising result. The inventors intended to obtain a whole egg, or to substitute the whole natural egg by a product coming from different elements, that were used in some stated process (we disclose it in every detail, even in those that could appear as obvious, against the aforesaid patents, lacking of details) and we were successful. This final unexpected result shows that this is an invention.

We add that the U.S. Pat. No. 1,227,336 is restricted to reproduce the properties of the natural egg yolk, being a product of acid reaction; the white, on the contrary, is of alkaline reaction, precisely the opposite reaction; the yolk constitutes about 28 to 30% of egg weight, meanwhile the white goes from about 55 to 60%; the yolk density does not go beyond about 1.030, meanwhile, that of the white is higher; the yolk has little albumin, meanwhile the white is albumin in its main part; the yoke has a considerably greater fat percent, meanwhile it scarcely exists in the white.

So we could enunciate notorious differences between them, for example textures used in cooking, viscosity, etc., stating an outlined difference between them. We state, therefore, that the reproduction of the natural egg-yolk is different from that of the whole natural egg (liquid phase) that we have obtained. Furthermore, the yolk and white mixture, as found proportionally and ordinarily in the natural egg, yields a third edible product, that in the last international food products congress, was pointed out as a protein-type, having physical and chemical properties differing from that of the original two parts. Summarizing, the U.S. Pat. No. 1,277,336 succeeded in reproducing the properties of the natural egg yolk, beginning from the plasma as an emulsifying agent; the U.S. Pat. No. 2,171,428 uses the plasma as an emulsifying agent for sausage; but the present invention reproduces the whole properties of the natural whole egg (liquid phase) using the plasma, not as an emulsifying agent, but as a protein furnishing agent.

It is important to point out that in the aforesaid patents, at no time mention is made about the product flavor as obtained in the respective formulae; meanwhile, surprisingly, in the present invention the natural whole liquid egg flavor is reproduced, without adding any flavoring agent. This flavor comes from the constitutive elements of the whole, as well as from the process to which they were subjected. Even if it could be said that the obtained yolk in U.S. Pat. No. 1,277,336 has the yolk flavor (although this is not indicated in the patent), in the present invention, the present inventors are not dealing with the white—or with the yolk flavor, as separately taken (it is obvious that they are different) but with the flavor of the whole natural egg.

Known ingredients, but unexpectedly combined in novel form, a surprisingly useful product is obtained which was unknown until now in the previous art.

It is widely known that one of the main concerns of mankind is the obtention of abundant protein sources in order to provide for the necessary supply of proteins in the daily diet of human beings.

Different researches that are being carried out permit the mass production of some types of proteins, such as soy, and intensive studies are being made to obtain proteins from mineral oil; also, encouraging results have been achieved, as yet only at a pilot level, in the extraction of proteins from alfalfa.

But until now, it had been difficult to find a really effective application for a very abundant source of proteins as is animal blood from animals, which are slaughtered for human consumption, such as beef cattle, pigs, chickens, hens, sheep and others, which supplies to the whole world a very large volume of raw materials with a high proteinic content of a natural origin.

Animal blood is partially or even totally wasted in many countries, and it has not been given the importance it rightfully deserves in human nourishment, because up to now it could not be presented in a practical way so as to make it perfectly compatible with the normal modalities of conventional food products.

SUMMARY AND OBJECTS OF THE INVENTION

An object of this invention is not providing cooking recipes to use blood as the basic or complementary ingredient in food, but it is rather an object of this invention to manufacture at industrial level a surprising and unexpectedly useful composition of high proteinic value which does not, in any manner, reveal its origin, and may be used as such or as an ingredient for the preparation of other food products, as in the case of natural egg.

In other words, the object is obtaining, from animal blood, or more precisely from the animal albumin obtained from blood by means of any of the known processes, an additive which unexpectedly does not show, from the point of view of the consumer, any characteristics that may relate it with the original raw material, as is the case with natural eggs, using for example, the same or similar culinary techniques to the ones used with eggs.

Another of the objects of this invention is the providing of a composition as a food additive or ingredient as indicated which can be obtained on the basis of the combinations of the aforementioned raw material: animal albumin, with other easily available natural and artificial food products, at a low cost, not requiring any type of critical products.

Furthermore, it is also an object of this invention to obtain the said food composition with a very simple process, not requiring the use of complex installations since the invention achieves a total or partial use of pre-existing installations, with minor changes, as the case may be, and which are used at present for the manufacturing of other products.

This process comprises individual known steps but their sequence, the working conditions and the ingredients are novel and unexpected.

The fundamental objective of the invention is to obtain a food additive with a high proteinic value, which is as easily used and accepted by the consumer as is the case of natural eggs, but which can be produced in different types, according to the different degrees of food assimilation capability found in human beings.

A further objective of the invention is to obtain, as an additional characteristic of the said product, a composition with properties similar to those of the complete natural egg, in such a way that the composition may act as complete natural egg when included in other products as a complementary ingredient in their processing.

It may be said that the object is to achieve a food additive or composition which, independently from its condition as such, may produce when added to other products, all the same effects discovered up to now in natural liquid egg (a mixture of egg white and yolk) but without any need to include in the process of preparation of the said product any part of whole natural egg nor any of the two parts composing it.

Another object is that the said product have the characteristic taste of natural egg, but without the addition of any type of flavoring agents.

DESCRIPTION OF PREFERRED EMBODIMENT

The term "fatty material" used herein is extended to cover edible fat and oils and mixtures of one or the other or both.

The product described above can be obtained by means of an adequate processing of the following elements: animal albumin obtained from phosphated or citrated blood, fatty materials of animal or vegetable origin; surfactants used as emulsifiers, or wetting agents, and potable water, and as optional additives, carbohydrates, antioxidants, and/or stabilizers.

With an adequate balance of the aforementioned components and the appropriate physicochemical handling, it is possible to obtain a product in the liquid state which, with the addition of an adequate food dye, may achieve an appearance similar to that of liquid natural egg, i.e. the mixture of egg white and yolk, and which may also be turned into a powder, without the common troubles of egg drying, subjecting it to the corresponding drying process, using any of the known techniques.

Animal blood supplies alumin in the form of a balanced mixture of substances of vital importance, such as the essential amino acids.

As fatty materials of animal and/or vegetable origin, partially or totally hydrogenated fat, obtainable from peanut, cotton, corn, coconut or grape oil and/or cow, pig, sheep and fish and similar materials will be used. Said fatty materials may be present in the inventive composition in the range of from about 4.0 to to about 17 weight percent of the composition.

As surfactants used as emulsifying or wetting agents, the use of phospholipids and lecithins is considered. It is also possible to use fatty materials of animal and vegetable origin, pure or combined, products esterified or transesterified previously purified or not with molecular distillation and produced with different esterification methods using various catalyzers and in addition desoxicolic acid, glycolic acid, taurocholic acid and their salts.

Generally, the following are preferred: mono and diglycerides of edible fats and oils, acetylated and/or lactylated mono and di-glycerides, propylene glycol monoesterates, sorbitol esterified fatty acids, all of them alone or combined totally or partially with each other.

Carbohydrates can also be used, and among them sugars in general are obtained from sugar cane, sugar beet, corn and others, alone or combined with each other.

The presence of antioxidants may be necessary, and among these are gallic acids, propylgallate, guaiacum gum, norhydroguaiaretic acid, tocopherols, phospholipids, butylated hydroxyanisol, hydroxy butyl toluene, ascorbic acid, citric acid, thiopropionic acid, ascorbic palmitate and dithiolauryl propionate, all of them alone or combined.

The stabilizing agents may, as desired, supply the emulsion itself with stability or stabilize the different mixtures of the emulsion in different media or formulae; they can be various phosphates, cellulose esters, carrageenates guar gum, xanthan gum, arabic gum, tragacanth gum, simple starches, hydrolyzed or modified starches, alginates and other, simple or combined with one or more of the others.

In the case that natural egg or similar color is desired, the natural dyes contained in the raw materials added may be used, or synthetic-natural food dyes as betacarotene, cryptoxanthine, beta-apo-8'-carotenal and carotenoids; synthetic-artificial dyes, the derivatives from coal tar edible grade. As color intensifier, whenever acceptable, orange or "sunset yellow", tartrazine or amaranth may be used, alone or combined with each other.

Also, in the scope of this invention, the inclusion of bacteriostatic preserving agents, fungistatics or germicides in general has been considered. The same may be added in each specific case, alone or combined, accordingly as it is preferable, and they may be: sodium and calcium propionate, epoxides, peroxides, organic acids: acetic, citric, lactic, propionic, fumaric, malic, tartaric, ascorbic, peracetic, isoascorbic; sodium diacetate, antibiotics (chlortetracycline, oxytetracycline, bacitracin), hypochlorites, Chloramine T, sodium monophosphate and calcium monophosphate, sodium and calcium pyrophosphate, tetrasodium pyrophosphate, sodium tripolyphosphate, sodium hexametaphosphate and parahydroxybenzoic acid ester; ethylene and propylene oxides, all of these acting independently or combined with one or more of the others.

On the basis of all the aforementioned exposition, the following example is given for the composition of the food additive according to the invention, in which its elements are represented in the following manner: a fatty material constituted by hydrogenated peanut oil with a melting point of 34° C.; a first emulsifier represented by soy lecithin; a second emulsifier constituted by glyceryl monostearate; the carbohydrate being cane sugar, the preserving agent being sodium benzoate, an antioxidant which is the same soy lecithin, and butyl hydroxytoluene or other agent in the proportion of 0.02% to the total weight of the fatty materials.

In this example, these components are included in the following proportions:

| | |
|---|---|
| hydrogenated peanut oil | 11.0% |
| soy lecithin | 3.0% |
| potable water | 34.4% |
| glyceryl monostearate | 1.0% |
| cane sugar | 0.1% |
| sodium benzoate | 0.5% |
| liquid phosphated animal albumin | 50.0% |

With regard to the dye and the stabilizer, they must be added in amounts in accordance with the color intensity and degree of stability desired for a given purpose.

The product is obtained applying a method of systematic introduction and operation, at normal or reduced pressure, whichever is preferred, of the aforementioned components, at certain temperatures and at the adequate time and in the correct volumes, so that the components are subject to cutting actions, and to an increase in the surface of particles, to achieve the chemical conditions and physical effects required to obtain certain types of crystals of fatty materials which must be surrounded by a continuous phase of the other components of the product, integrated in the animal albumin.

The manufacturing method or process of the said product comprises, in one of the simplest forms, the following steps, which are carried out in one reactor that is, for example, of the Pfaudler type with an "homomizer" stirrer, with high stirring capacity. In it, the liquid is displaced from the center of the stirrer towards the surrounding three hundred and sixty degrees, from bottom to top, and deflected by a deflection plate, so as to prevent the incorporation of air and thus the formation of foam.

The reactor as such, is fitted with a jacket with vapous inlets and outlets and also inlets and outlets for cooling liquids.

The glyceryl monostearate is melted and is added to all of the hydrogenated oil, previously melted, and the antioxidant is added while trying to maintain the mixture at a melting temperature at least 70° C. with continuous strong stirring.

Maintaining the mixture under intense stirring, the temperature is lowered to 40° C., with the purpose of preserving the basic properties of the soy lecithin, which is added once this temperature has been reached, so that the phospholipids represented in this case by this lecithin may react as such in the mixture.

If the temperature is higher, the power and general properties of these phospholipids will decrease, and it is convenient to preserve them for the basic conception of the invention.

In this way, even though the temperature is afterwards increased, as will be seen, its action is not exerted directly on the lecithin, but on the mixture of the same and the emulsifier.

Immediately after water is added to the reaction mixture containing all the cane sugar, the sodium benzoate, the stabilizer and the dye, if included in this phase, is previously dissolved. The dye may be added in this phase or in the fatty phase, as preferred.

Previously the water has been boiled, to become sterilized, and then cooled to a temperature of sixty to seventy degrees centigrade.

With the addition of this aqueous phase (60°-70° C.) which is done while maintaining the intensive stirring of the mixture previously made, a slow but progressive increase in its temperature is achieved, which does not entail any risk for the properties of the phospholipids. By means of this increase in temperature a certain crystallization of the lipids of the fatty acids included in the mixture takes place and, as the intense stirring continues, the said crystals remain dispersed in the aqueous phase due to the emulsifiers which have been added: first glyceryl monostearate and then lecithin.

In this way, as the water is added, an emulsion of the water in fat type is formed, until equilibrium is attained. At that time, a certain coagulation takes place and the mixture thickens acquiring the physical characteristics of a pasty gel.

As water continues to be added, an inversion in the terms of the emulsion takes place and it becomes of the fat in water type and the fat particles will be dispersed in the aqueous phase.

Once the temperature of about 40° C. is obtained, the liquid animal albumin begins to be added; at first a certain small part of the total volume is added slowly, e.g. twenty percent, at the same temperature of the emulsion; then the rest of it is added rapidly. In this way it becomes part of the aqueous phase and, due to the intense stirring, a perfect emulsion is obtained.

In connection with the albumin, the following note is made: it is possible to use either albumin in liquid state since the time of its obtention through the corresponding process, or citrated and/or phosphated albumin which, at the end of the obtention procedure, has been dried into powder by any of the conventional methods without modifying its original state. Water must be added to the latter until the original state is reached.

The fundamental point is that the amount of albumin added must supply solids of at least three percent in weight.

Even though due to the intense stirring there is a true homogenization of the emulsion, the particles suspended in the fatty phase do not attain the size of two or three microns. Therefore the mixture at a temperature of approximately 40°-50° C. is subjected to the action of an homogenizer, which can be a one or two stage type or a colloidal mill.

The dough is then subject to a regeneration process, passing it through an "APV" or similar regenerator, where the temperature drops to 25° C. and then must be dropped as quickly as possible to a temperature not over 10° C. and held at that level.

The technical features of the different models of regenerators and their performance can be seen in the "Bulletin IP-173" of APV Co., Inc., Tonawanda Industrial Park, 395 Fillmore Avenue, U.S.A.

The emulsion obtained with this procedure has been cooled slowly, so that germs of fatty crystals are formed. The growth of these crystals is regulated with the temperature, causing them to develop to a limit; their development finishes when the temperature drops to 10° C. at the end of the process, even though the growth stability is only achieved when the finished product is stored at a low temperature in a refrigerator, to be preserved until its use.

All this has the purpose of inhibiting the growth of the fatty crystals and of holding them in the state of microcrystals once this state has been achieved. If the temperature is not lowered rapidly at least to the level indicated above and it remains at 20°-25° C., for example, the growth of some crystals might not be inhibited and therefore it might continue while the emulsion is stored. If this happened, the emulsion would progressively change from a liquid to a paste, which would result in a product with inadequate properties. The emulsion must be kept in a refrigerator at a low temperature preferably at 5° C. or less.

To obtain a powder, the procedure is somewhat different. After the homogenization stage, the liquid, virtually at a temperature of 50° C., must be fed to a conventional drying system, that can be of the spray type eventually combined with the fluid-bed type.

The ideal system would be lyophilization, but it is extremely expensive from the industrial point of view.

It might be added that if a spray type system is used, the input temperature of the liquid must not be higher than 70° C., in order to preserve the product, and it is very important to carry out the subsequent cooling of the powder very rapidly, until a temperature of 10° C. is reached, with a vibration, etc., process at the output, similar to that applied for the spray drying of milk of the "instantaneous" type, so that the powder will be easily dissolved in water.

In this way an emulsion will be obtained with similar reactions to those of the emulsion obtained by the dissolution of the powder of while egg obtained with a similar drying system.

Even though the low moisture content is in itself a good defense, in order to maintain this powder in optimum condition, it must be vacuum packed or packed with an inert or sterilizing gas.

In case a more rapidly humidifying or humectant product is desired, humidifying agents may be added to the formula, or the powder obtained may be treated with dioctyl sulfosuccinate, for example, edible grade, dissolved in alcohol, by means of spraying and intimate mixing.

Undoubtedly, when this invention is put into practice, some changes may be introduced in certain details of the composition or the manufacturing process of the industrial additive for human food with high proteinic value referred to above, but always utilizing the principles as specified in the following claims.

Consistent with the foregoing illustrative examples, it is seen that a number of specific compositions are useful according to the invention. A specific high proteinic composition comprises the following range of components, all being specified in weight percentage based upon the said composition:

| Component | Ranges weight % |
|---|---|
| hydrogenated peanut oil | 4–17% |
| glyceryl monostearate | 1–8% |
| soy lecithin | 3–6% |
| potable water | 5–35% |
| cane sugar | 0.1–5% |
| sodium benzoate | 0.1–0.5% |
| liquid phosphated animal albumin | 50–86.8% |

While specific embodiments of the invention have been shown and described in detail to illustrate the application of the principles of the invention, it will be inderstood that the invention may be embodied otherwise without departing from such principles.

What is claimed is:

1. A process for the manufacturing of a composition for use as human food with high protein value and simulating a liquidous whole egg material, comprising the following steps: mixing adequately with stirring a first emulsifier selected from the group consisting of mono and diglycerides, acetylated and lactylated mono and diglycerides, propylene glycol monostearate, sorbitol fatty acid esters, glycerol monostearate and mixtures thereof with from about 4.0 to about 17 weight percent based on the weight of the composition of a fat oil in a fluid state until a homogeneous mixture is obtained at a temperature of about 70° C.; reducing the temperature of the resultant mixture, while continuing the stirring, to about 40° C.; adding thereto with continuous stirring lecithin followed by the gradual addition to said combined mixture of water containing a sugar in sweetening amounts and a preserving agent previously dissolved at a temperature from about 60° C. to about 70° C., so as to obtain a slow but progressive increase in the temperature of the whole mixture, always under stirring, until the said mixture is converted into a fat in water emulsion; lowering the temperature of the resultant emulsion to about 40° C. and then adding from about 50 to about 86.8 weight percent based on weight of composition of animal blood albumin in two stages: in the first stage not more than about 20 weight percent of albumin being added in a slow manner at a rate sufficient to maintain said emulsion, and in the second stage the rest of the albumin being added rapidly; subjecting said emulsion to an homogenization step at a temperature from about 40° C. to about 50° C., until microcrystals of fatty material of size of about two or three microns are obtained, and reducing the temperature to about 25° C. and reforming the emulsion and cooling said emulsion immediately to a temperature not higher than about 10° C.; and finally storing the emulsion at a temperature of −5° C. or less, the total percent by weight of said emulsifying agents being in the range of about 4 to about 14 weight percent of the composition and the total percent by weight of water being 5 to 35 weight percent of the composition.

2. A high proteinis composition, useful for preparing human foods which simulate a liquidus whole egg material comprising (a) a lipophilic phase consisting essentially of microparticles of fatty material and (b) a continuous hydrophilic phase surrounding said lipophilic phase, prepared by the process of claim 1.

3. A high proteinic composition according to claim 1, wherein said composition comprises a product in the fluid state.

4. A high proteinic composition according to claim 1, wherein said composition comprises a product in the dry state as a pulverulent material.

5. A high proteinic composition according to claim 3, wherein said blood albumin is present in said composition in a phosphated and liquid state in an amount not less than about 50 weight percent of the composition.

6. A high proteinic composition in accordance with claim 1 wherein said composition includes an antioxidant.

7. A high proteinic composition according to claim 1, wherein said composition includes at least one food dye.

8. A high proteinic composition according to claim 1, wherein said composition includes glyceryl monostearate as an emulsifying agent in addition to soy lecithin.

9. A high proteinic composition according to claim 1, comprising the following range of components, all being specified in weight percentages based upon the said composition:

| Component | Ranges Weight % |
|---|---|
| hydrogenated peanut oil | 4–17% |
| glyceryl monostearate | 1–8% |
| soy lecithin | 3–6% |
| potable water | 5–35% |
| cane sugar | 0.1–5% |
| sodium benzoate | 0.1–0.5% |
| liquid phosphated animal albumin | 50–86.8% |

* * * * *